United States Patent [19]

Beckmann

[11] 4,089,304

[45] May 16, 1978

[54] APPARATUS FOR SUPPLYING FEEDWATER TO A STEAM GENERATOR

[75] Inventor: Georg Beckmann, Vienna, Austria

[73] Assignee: Waagner-Biro Aktiengesellschaft, Austria

[21] Appl. No.: 734,339

[22] Filed: Oct. 20, 1976

[30] Foreign Application Priority Data

Oct. 23, 1975 Austria ............................ 8077/75

[51] Int. Cl.² ........................ F22D 1/00; F22D 1/32
[52] U.S. Cl. ................................. 122/412; 122/441; 55/208
[58] Field of Search ........... 122/1 R, 412, 441, 451 R; 55/39, 49, 200, 208

[56] References Cited

U.S. PATENT DOCUMENTS

| 1,614,148 | 1/1927 | Musselman et al. | 55/200 |
| 1,634,776 | 7/1927 | Gibson | 55/49 |
| 2,663,547 | 12/1953 | Evans, Jr. et al. | 122/441 |

FOREIGN PATENT DOCUMENTS 1,338,860  11/1973  United Kingdom ............ 122/1

Primary Examiner—Kenneth W. Sprague
Attorney, Agent, or Firm—Steinberg & Blake

[57] ABSTRACT

Apparatus for supplying feedwater to a steam generator, such as a waste-heat boiler, includes the feature of degassing feedwater at a degassing station by way of a suitable degassing means, the feedwater being degassed by being heated to boiling temperature. Prior to reaching the degassing means at the degassing station the feedwater supplied thereto is heated by being placed in a heat-exchanging relationship with respect to water which has already been degassed by the degassing means at the degassing station. The degassed water which is thus cooled by giving up its heat to the water supplied to the degassing means is then delivered to the steam generator at a temperature which is substantially less than the temperature of the water at the degassing means.

10 Claims, 2 Drawing Figures

APPARATUS FOR SUPPLYING FEEDWATER TO A STEAM GENERATOR

BACKGROUND OF THE INVENTION

The present invention relates to steam generators, particularly waste-heat boilers, and in particular the present invention relates to apparatus for supplying feedwater to such a steam generator.

The present invention relates in particular to apparatus for feeding to such a steam generator feedwater which is in a degassed condition, the feedwater being heated to the boiling temperature in order to be placed in its degassed condition.

It is already known, in order to avoid corrosion from water in a steam boiler, to degas the treated boiler feedwater in a degasser at boiling temperature, with hydrazine often being utilized for any residual degasification. In the case of fossil-fired steam boilers, the supply of feedwater takes place at temperatures above 100° C, so that the degassing of the feedwater can take place in the preheating circuit of the feedwater. However, in the case of steam boilers, particularly waste-heat boilers, where there is no appreciable preheating of feedwater by exhaust steam of a turbine, the degassing of the feedwater is provided by directing part of the generated steam, through a suitable branch conduit, to a feedwater degassing means, approximately 15% of the generated steam being utilized for this purpose. The degasser will then deliver feedwater at the boiling temperature, so that the feedwater temperature is predetermined.

A method and apparatus of this latter type is thermodynamically uneconomical, inasmuch as an undesirably large portion of the generated steam at a relatively high temperature must be cooled to a relatively low temperature level in order to heat the feedwater to its boiling temperature. Moreover, a method and apparatus of this type sets a high limit on the discharge temperature of the boiler.

SUMMARY OF THE INVENTION

It is accordingly a primary object of the present invention to provide apparatus which will avoid the above drawbacks.

In particular, it is an object of the present invention to provide apparatus according to which it is possible to reduce the amount of steam required for degassing purposes, as compared with conventional methods and apparatus as referred to above.

Also it is an object of the present invention to provide apparatus according to which it becomes possible to lower the temperature of the waste gas derived from a waste-heat boiler, which is used as a steam generator, beyond the temperature of such waste-gas as encountered in conventional waste-heat boilers.

It is furthermore an object of the present invention to provide an apparatus of the above type which can readily be converted between a conventional type of operation and an operation according to the present invention, so that in the event of damage to part of the apparatus of the invention, conventional operations can go forward while repairs are carried out.

Thus, it is an object of the present invention to provide apparatus which is far more efficient than conventional methods and apparatus, delivering feedwater in a degassed condition to a boiler or other steam generator at a temperature far lower than has heretofore been possible while at the same time making more use, in a highly economical manner, of the available heat.

It is in particular an object of the present invention to provide apparatus which is highly suitable for purposes such as extracting heat from bulk materials such as hot coke or clinkers, the present invention being especially suitable in connection with making use of heat extracted from hot coke during dry quenching thereof in a suitable bunker.

With the apparatus of the invention there is provided a heat-exchanger means through which the feedwater flows prior to reaching the degassing means and through which the degassed water flows to give up part of its heat to the water which is being delivered to the degassing means.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
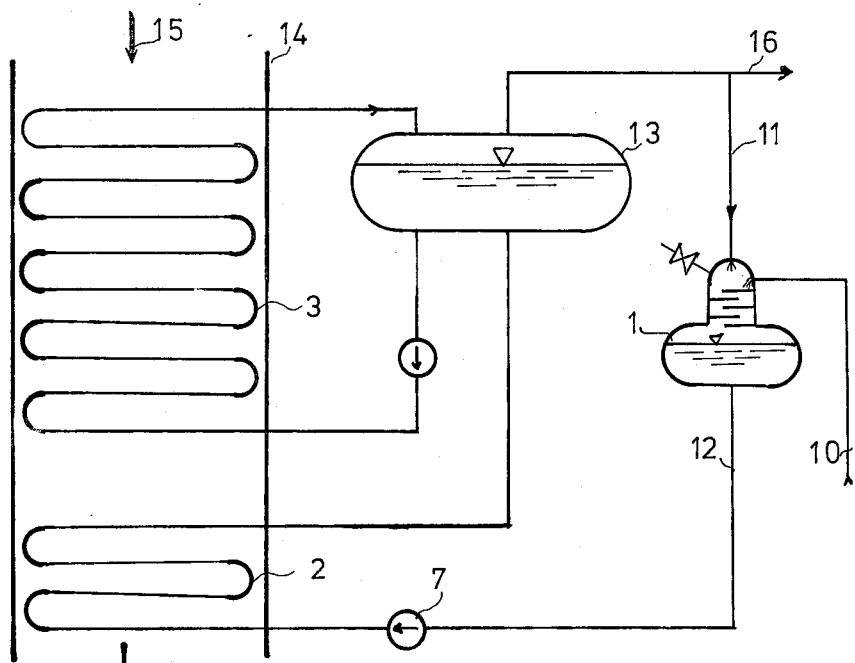
FIG. 1 is a schematic illustration of a known system for supplying degassed feedwater to a steam generator.

Referring to FIG. 1, there is schematically illustrated therein a known circuit for degassing boiler feedwater. The cold feedwater flows through the conduit 10 into the degassing means 1. At the degassing means 1, which is of a well known construction, the feedwater is degassed by being heated to the boiling temperature, and for this purpose use is made of steam derived from the branch conduit 11. The degassed water is delivered at approximately 105° C by way of the discharge conduit 12 to a feedwater pump 7 where the pressure of the feedwater is increased and the feedwater is pumped under pressure into the feedwater preheater 2. In the feedwater preheater 2 the feedwater is heated up to approximately boiling temperature which now corresponds to the boiler pressure, and from the preheating means 2 the feedwater flows into the boiler drum 13. With the arrangement illustrated in FIG. 1, approximately 15% of the generated steam is utilized for feedwater degassing, and the lowest outlet temperature for the gas of the waste-heat boiler 14 at the discharge end thereof is provided with a lower limit according to which the discharging gas cannot have a temperature lower than approximately the 105° C temperature of the feedwater received at the preheater means 2. The condensation of approximately 15% of the generated steam at the degasser results in a thermodynamic loss. The gas flowing through the waste-heat boiler 14 is schematically indicated by the arrows 15, and the generated steam which is not utilized for degassing the feedwater flows through the conduit 16 to any installation which makes use of the steam.

Figure 2:
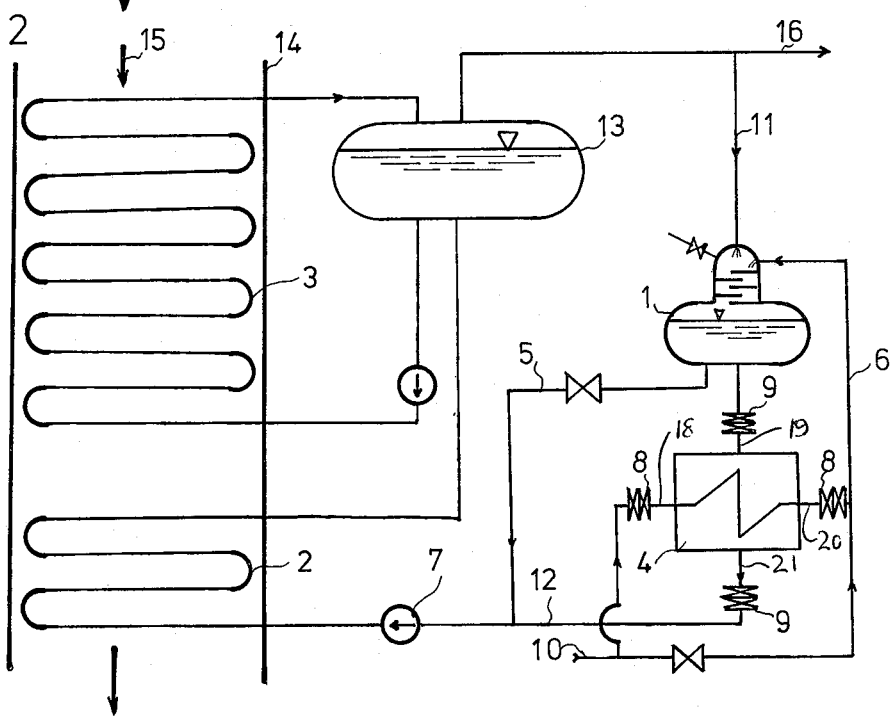
FIG. 2 is a schematic illustration of apparatus according to the present invention for supplying feedwater to a steam generator.

Referring now to FIG. 2, there is schematically illustrated therein an arrangement according to the invention shown in a circuit form similar to the manner in which the known structure of FIG. 1 is illustrated. In the case of the arrangement of the invention shown in FIG. 2, in order to degas the feedwater no more than 2–3% of the generated steam is required inasmuch as the treated boiler feedwater is heated in a recuperator-type of heat exchanger means 4 up to approximately 95° C prior to entering into the degassing means 1 which is situated at a suitable degassing station. At the degassing means 1, degassing of the feedwater is carried out at approximately 0.25 atmosphere (18 psi) with the supplied steam which is delivered to the degassing means being required only to provide the amount of heat for the difference between the 95° C temperature of the feedwater entering the degassing means and the 105° C temperature to which the feedwater is heated for degassing the same. The steam for this purpose is delivered to the degassing means 1 by way of the branch conduit 11.

In the case of FIG. 2 the degassed water is also delivered by way of a discharge conduit means 12 through the feedwater pump 7 to the preheater means 2. However, in the arrangement of the invention shown in FIG. 2, the discharge conduit means 12 is operatively connected with a heat-exchanger means 4 through which the degassed water flows before reaching the pump 7 in the example illustrated in FIG. 2. In the illustrated example the heat-exchanger means 4 is provided with tubes along the interior of which flows the feedwater which is preliminarily heated before reaching the degassing means 1, while the degassed water which gives up its heat to the feedwater flowing toward the degassing means 1 flows through the heat exchanger means 4 at the exterior of the tubes therein. The heat exchanger means 4 is a counterflow type of recuperator heat exchanger in that the feedwater to be heated and the degassed feedwater which gives up its heat respectively flow in different directions, these directions being substantially crosswise of each other in the illustrated example. The tubes in the heat exchanger means 4 can be straight tubes or they can also take the form of U-shaped tubes. This latter type of construction is preferred inasmuch as it provides for an easy convenient possibility of exchange of the bundle of tubes in the event of damage.

In order, in the case of damage, to be able to maintain the installation in operation, a bypass discharge conduit means 5 and a bypass supply conduit means 6 are provided. Thus it will be seen that the bypass discharge conduit means 5 communicates with the degassing means 1 and the discharge conduit means 12 downstream of the heat exchanger means 4. This bypass conduit 5 carries a valve which is maintained closed during use of the heat exchanger means 4. However in the event of damage to the latter the valve carried by the conduit means 5 is opened so that this bypass conduit means 5 can be used for directly delivering the degassed feedwater to the discharge conduit means 12 downstream of the heat exchanger means 4 providing in this case a circuit which is the equivalent of that of FIG. 1.

In the same way, the bypass supply conduit means 6 carries a valve which is closed when the heat exchanger means 4 is used but which can be opened in the event that the heat exchanger means 4 is damaged so that in this case the bypass conduit means 6 can be used for supplying the feedwater directly to the degassing means 1, providing in this way also an equivalent of the system of FIG. 1.

The heat exchanger means 4 has an inlet 18 for the feedwater which is to be degassed and an inlet 19 for the degassed feedwater. Also the heat exchanger means 4 has an outlet 20 for the feedwater which is to be degassed and an outlet 21 for the degassed feedwater which has been cooled by the heat exchanger means 4. At the inlet 18 and the outlet 20 the system includes a pair of valved means 8 for conveniently disconnecting the heat exchanger means 4 from the illustrated system, and in the same way at the inlet 19 and the outlet 21 the structure includes a pair of valved means 9 also for disconnecting the heat exchanger means 4 from the illustrated circuit. Thus, each of these valved means 8, 9 includes a suitable valve and fittings by way of which it is possible easily to connect the heat exchanger means 4 into the system or disconnect it from the system, the valves of the several means 8, 9 of course being open during operation of the heat exchanger means 4 while being closed when the heat exchanger means 4 is disconnected from the system to be replaced by a new heat exchanger means or to be repaired and then reintroduced into the system.

Thus, with the system of the invention illustrated in FIG. 2, normally the bypass conduit means 5 and 6 will be closed and advantage will be taken of the use of the heat exchanger means 4 in order to reduce the temperature of the feedwater reaching the preheater means 2 while elevating the temperature of the feedwater travelling toward the degassing means 1. At the same time, if necessary, the heat exchanger means 4 can easily be removed from the system and in this case the valves of the bypass conduit means 5 and 6 will be opened so that the operations can continue with the bypass conduit means 5 and 6.

Thus, as indicated above, the feedwater entering the heat exchanger means 4 at the inlet 18 is heated in the heat exchanger means 4 up to approximately 95° C to reach the degassing means at this latter temperature where the feedwater is further heated up to 105° C by way of the steam delivered the conduit 11. On the other hand, the degassed water flows through the heat exchanger means 4 at the exterior of the tubes thereof giving up heat in the heat exchanger means 4 so that the degassed feedwater is delivered through the discharge conduit means 12 to the feedwater pump 7 at a temperature on the order of 35° C, and it is at this latter temperature that the degassed waters enters the preheater means 2. As a result, the gas 15 which discharges from the outlet of the waste-heat boiler 14 has in the case of FIG. 2 a much lower temperature than in the case of FIG. 1. This lower temperature of the gas discharging from the waste-heat boiler 14 is of particular importance where the gas from the waste-heat boiler is utilized for cooling bulk material such as hot coke or hot clinker. When utilized for a purpose of this latter type, the hot bulk material such as hot coke in a suitable bunker has circulated therethrough a quenching gas which cools the hot coke or other bulk material by extracting heat therefrom, this quenching gas flowing along a circuit which includes the waste-heat boiler 14. Thus the gas flows upwardly through the hot coke or other bulk material and then from the latter through the steam generator 14, to be returned therefrom to the hot coke. By reason of the fact that with the arrangement of the invention the gas flowing from the steam generator 4 to the hot bulk material is at a relatively low temperature, this gas can extract from the hot bulk material a greater amount of heat than with a conventional arrangement as shown in FIG. 1 where the gas discharging from the boiler 14 is necessarily at a substantially higher temperature than in the case of FIG. 2.

Therefore, with an arrangement of the invention as shown in FIG. 2 it is possible to provide for such hot bulk material a much lower temperature than is possible with an arrangement as shown in FIG. 1. As a result, the bulk material is cooled to a greater extent with an arrangement as shown in FIG. 2, thus achieving for the bulk material a lower temperature while extracting a greater amount of heat therefrom. As a result it is possible to derive from the heat extracted from the bulk material a greater amount of steam which can be delivered by way of the conduit means 16 to any desired location where this steam is to be used. At the same time, the hot bulk material is cooled to such an extent that the further transport thereof away from the bunker or the like can be carried out by way of simple conveyer belts which will not be damaged because of the lower temperature of the bulk material which can be achieved with the arrangement of the invention. At the same time, because of the more favorable thermodynamic process of the invention the heating surface area of the waste-heat boiler can be reduced so that for an output which may be the same as that of the arrangement of FIG. 1 it is possible to utilize a less expensive boiler, and in this way the added costs required by way of the recuperator 4 can be more than compensated.

A further advantage of the installation of the invention resides in the fact that any corrosion which occurs from poorly degassed feedwater must be situated only at the exterior of the boiler 14.

It is possible to avoid any corrosion of this latter type by making the recuperator type of heat exchanger means 4 of a corrosion-free material, such as, for example, austenitic steel.

What is claimed is:

1. In an apparatus for supplying feedwater to a steam generator, such as a waste-heat boiler, degassing means for degassing water by heating the same to boiling temperature, supply conduict means communicating with said degassing means for supplying feedwater thereto to be degassed therein, discharge conduit means communicating with said degassing means for discharging degassed water therefrom, heat-exchanger means communicating with both of said conduit means for extracting heat from the degassed water and delivering the latter heat to the water which is to be degassed, said discharge conduit means communicating downstream of said heat-exchanger means with a steam generator for delivering degassed water thereto at a temperature less than the temperature of the water at the degassing means, supply bypass conduit means communicating with said degassing means for supplying feedwater thereto while bypassing said heat-exchanger means and discharging bypass conduit means communicating with said degassing means and said steam generator for delivering degassed water to the steam generator while bypassing said heat-exchanger means, both of said bypass conduit means carrying valve means for normally closing both bypass conduit means while said heat-exchanger means is used, said heat-exchanger means having a pair of inlets respectively connected with said discharge conduit means and supply conduit means for respectively receiving degassed water and water to be degassed, and said heat-exchanger means also having a pair of outlets respectively communicating with said discharge conduit means and supply conduit means for discharging cooled degassed water from said heat exchanger means and for discharging heated feedwater to be supplied to the degassing means, and valved means situated at each of said inlets and outlets for connecting said heat-exchanger means into and disconnecting the same from the supply and discharge conduit means.

2. The combination of claim 1 and wherein the steam generator includes a preheater means with which said discharge conduit means communicates downstream of said heat exchanger means.

3. The combination of claim 1 and wherein a feed pump is operatively connected with said discharge conduit means downstream of said heat-exchanger means for pumping the degassed water after cooling thereof at the heat-exchanger means to the steam generator.

4. The combination of claim 1 and wherein said heat-exchanger means includes heat-exchanging tubes along the interior of which the water supplied by the supply conduit means flows and along the exterior of which the degassed water flows.

5. The combination of claim 4 and wherein the tubes of the heat exchanger are U-shaped tubes.

6. The combination of claim 1 and wherein said heat-exchanger means is situated adjacent said degassing means.

7. The combination of claim 1 and wherein said heat-exchanger means is made of a non-corrosive material.

8. The combination of claim 7 and wherein said non-corrosive material is austenitic steel.

9. The combination of claim 1 and wherein said heat exchanger means provides for the water which is to be heated and the water which is cooled different directions of flow, respectively.

10. The combination of claim 9 and wherein the degassed water which is to be cooled flows in the heat-exchanger means across the water which is to be degassed and which is heated in the heat-exchanger means.